UNITED STATES PATENT OFFICE.

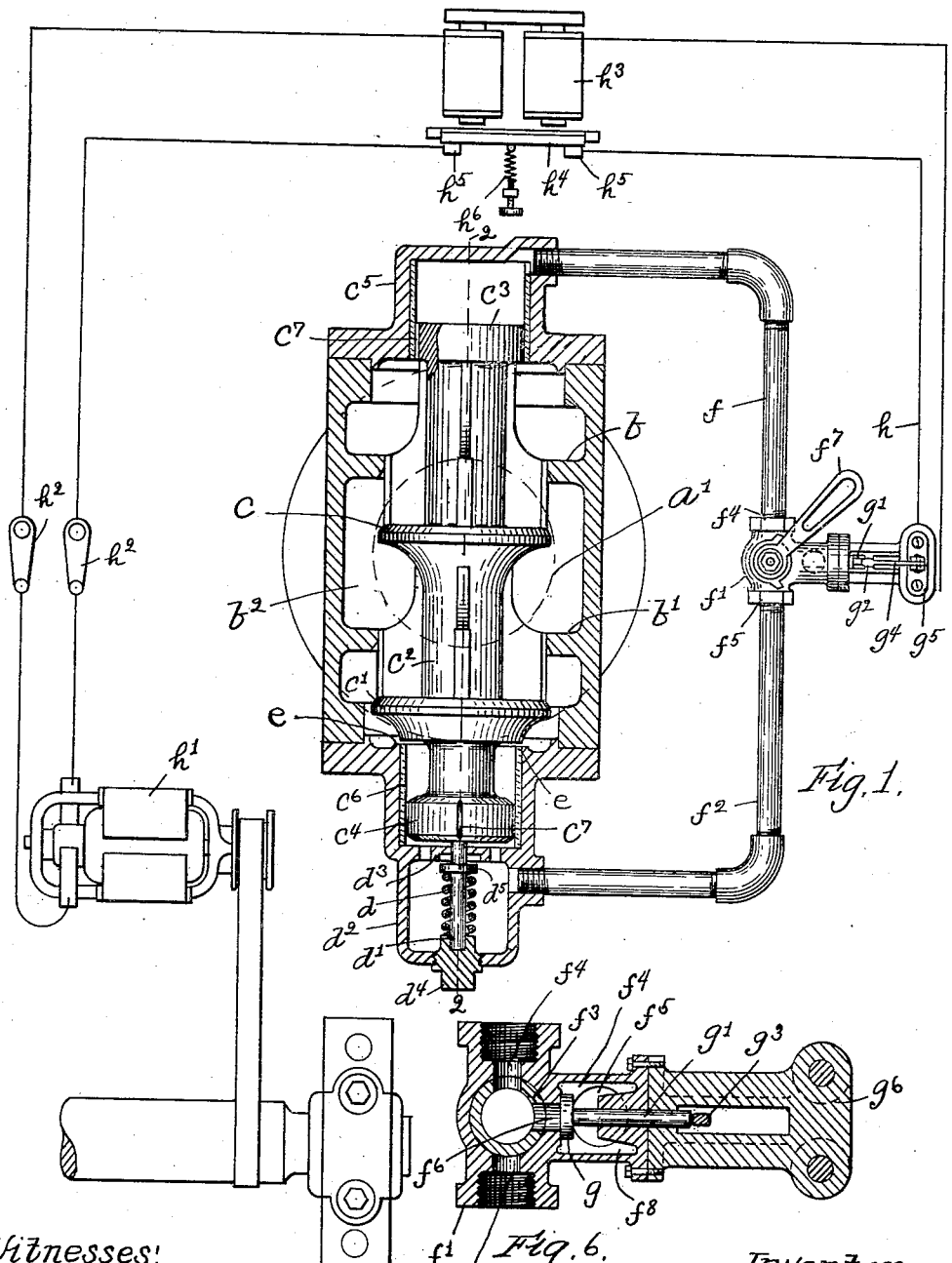

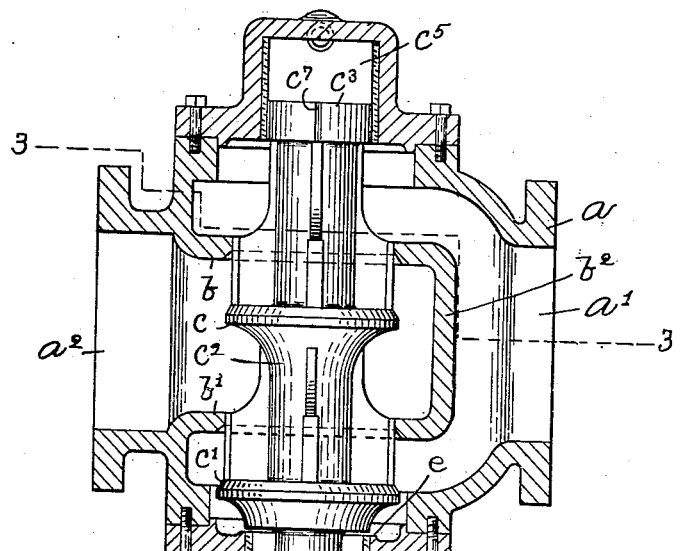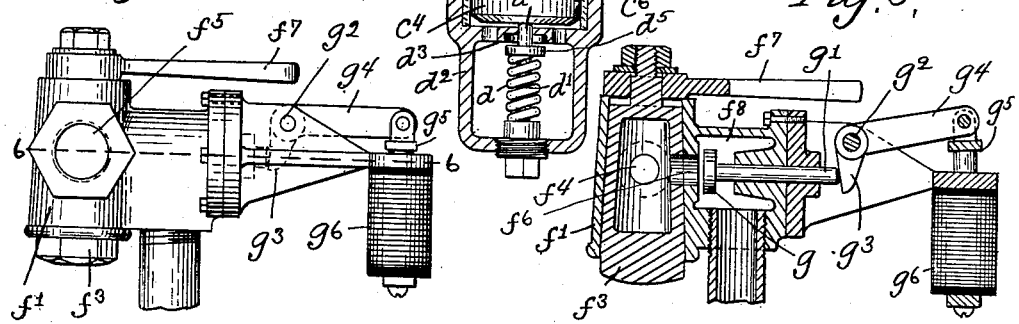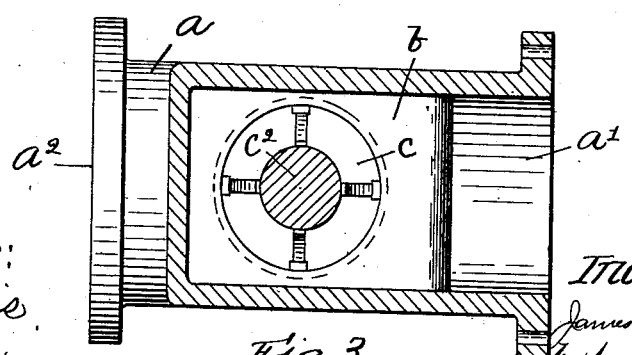

JAMES L. KIMBALL, OF SALEM, MASSACHUSETTS, ASSIGNOR TO LOCKE REGULATOR COMPANY, OF SALEM, MASSACHUSETTS, A CORPORATION OF MAINE.

AUTOMATIC ENGINE STOP-VALVE.

No. 912,385.  Specification of Letters Patent.  Patented Feb. 16, 1909.

Application filed March 27, 1908. Serial No. 423,506.

*To all whom it may concern:*

Be it known that I, JAMES L. KIMBALL, of Salem, county of Essex, State of Massachusetts, have invented an Improvement in Automatic Engine Stop-Valves, of which the following is a specification.

This invention relates to engine stop valves, and has for its object to improve the construction of the shut-off valve to the end that it may be balanced; that its sensitiveness to shocks due to repeated operations of the cut-off for the engine are reduced to the minimum; that it may be positively moved in both ways by the steam pressure to close and to open the way, two actuators being provided for this purpose; that its operation may be controlled by exhausting the pressure at either end of the valve, permitting the pressure at the opposite end to move the valve, two exhaust passages being employed for this purpose; that the movement of the valve in a direction away from its seat is limited by a yielding stop; that the valve may be adjusted to an inoperative position, so that the controlling-devices for it may be removed or repaired; that the actuators for the valve may be retarded so that when permitted to operate the valve, said valve will be moved slowly; and that the actuators for the valve may be reset as the valve is moved.

The invention also has for its object to improve the construction of the controlling-devices for the shut-off valve to the end that the two exhaust passages may be controlled, one electrically and the other manually, so that the valve may be closed by electrically operated means and thereafter opened or returned to normal or reset by hand operated means.

Figure 1 is a vertical section of the shut-off valve showing in plan view the controlling-devices therefor embodying this invention. Fig. 2 is a vertical section of the shut-off valve shown in Fig. 1, taken on the dotted line 2—2. Fig. 3 is a transverse section of the shut-off valve taken on the dotted line 3—3 Fig. 2. Fig. 4 is a side elevation of the controlling-device for the shut-off valve. Fig. 5 is a vertical longitudinal section of the controlling-device shown in Fig. 4. Fig. 6 is a horizontal section of the controlling-device shown in Fig. 4, taken on the dotted line 6—6.

A shut-off valve, such as may be employed in carrying out my invention, will be first described.

$a$ represents the valve-case, which is of any suitable shape and construction, having an inlet $a'$ and an outlet $a^2$. A partition wall is contained in said case which separates the inlet and outlet and forms within the case two chambers, one connected with the inlet and the other with the outlet, and said wall is designed to support and guide a vertically movable double puppet-valve. As herein shown, the partition wall comprises two horizontal portions $b$ and $b'$, arranged respectively above and below the outlet $a^2$, which extend inward from one side of the case to a point near the opposite side thereof and also from front to back of the case, and a vertical portion $b^2$ connecting said horizontal portions, so that the inlet chamber of the case extends above the upper horizontal portion and below the lower horizontal portion, and the outer chamber of the case extends below the upper horizontal portion and above the lower horizontal portion. Each horizontal portion is formed with a circular hole through it, beveled on its under side to form a valve-seat, and said holes are arranged in vertical alinement.

The double puppet-valve consists of two circular disks $c$ and $c'$ so arranged on a stem $c^2$ as to respectively engage the two valve-seats formed in the horizontal portions $b$ and $b'$, of the partition wall when closing the way. The valve-stem is extended beyond the disks at both ends and is provided at each end with a piston, $c^3$, $c^4$, the areas of which are the same. Said pistons work respectively in cylinders $c^5$, $c^6$, arranged at opposite ends of the valve-case, said cylinders are arranged to communicate with the inlet chamber of said valve case. Each piston has a groove along its side as shown at $c^7$, or is otherwise formed to provide for the passage or substantial leakage of steam by it from the inlet chamber into the cylinder, so that the pressure on the inlet chamber of the valve case at all times acts upon both pistons. The valve is balanced by the steam pressure acting equally upon both pistons and remains in either position it may be set until moved by exhausting the pressure from one of the cylinders, as for instance, when the valve is open, as shown in the drawings, and it is desired to close it, the pressure of the cylinder $c^5$ is exhausted, whereupon the pressure in the cylinder $c^6$, acting upon the piston therein positively moves the valve and closes it, and when it is desired to subsequently open the valve the pressure of the cylinder $c^6$ is exhausted, whereupon the pressure in the cylinder $c^5$ acting upon the piston therein positively moves the valve and opens it. Thus the piston $c^4$ working in the cylinder $c^6$ constitutes the closing actuator for the valve, and the piston $c^3$ working in the cylinder $c^5$ constitutes the open actuator for the valve. In either position of the valve, one of the pistons occupies a position at or near the end or bottom of its cylinder, consequently there is a small volume of steam back of it, so that when the steam is exhausted from the other cylinder, said piston will immediately start but will move slowly as the steam leaks by it and enters the cylinder back of it. As a sudden movement of the valve in either direction is not desired, its movement may be regulated by the sizes of the passages which are formed in the sides of the pistons.

At one end of the valve-case a buffer-spring $d$ is provided for checking movement of the valve in one direction, and, as herein shown, said spring is arranged to be acted upon by the piston $c^4$. The spring $d$ is arranged on a pin $d'$ supported on an extension $d^2$ of the valve-case. This extension is made hollow, and a partition wall $d^3$ separates it from the cylinder $c^6$, which is perforated to provide for the passage of steam through it into said extension. Such extension provides for the storage of an additional volume of steam to start the piston and the valve connected with it when the pressure is exhausted from the cylinder $c^5$. The lower end of the pin $d'$ enters a socket in the nut $d^4$ which is screwed into a threaded hole in the end of the extension $d^2$, and the other end projects through a hole in the partition wall $d^3$, so as to be engaged by the piston $c^4$, and the lower end of the spring bears against said nut, and the other end thereof bears against a fixed collar $d^5$ on the pin, the action of which is to lift the pin. The stress of the spring $d$ may be varied by adjusting the nut $d^4$. In addition to utilizing the spring as a buffer it is employed as a yielding stop for limiting the movement of the piston $c^4$, and by adjustment of the nut $d^4$, movement of the piston may be checked at the different points.

The under face of the disk $c'$, opposite its valve-formed face, is ground to serve as a valve, and is arranged to engage a valve-seat $e$, which is arranged at the inner end of the cylinder $c^6$, and when said disk is moved into engagement with said valve $e$ the passage of steam to the cylinder $c^6$ is stopped.

In the normal operation of the valve, the spring-actuated pin is adjusted so that the movement of the piston $c^4$ will be checked just before the disk $c'$ closes upon the valve-seat $e$, so that the steam has free access to the cylinder $c^6$, although said pin $d'$ is free to move into the recess in the nut by pressure of the piston $c^4$ thereon, sufficient to enable the disk $c'$ to close on the seat $e$. The purpose of providing means for cutting off the supply of steam to the cylinder $c^6$, will be hereinafter set forth.

The shut-off valve herein shown is very effective, is easily balanced, is sensitive to such an extent as to permit it to be easily yet positively operated, giving it that certainty of operation which is required of a device of this kind. Furthermore, by providing it with a piston and cylinder at each end, the shocks due to the repeated action of the cut-off valve of the engine are absorbed, which is a very important feature. Furthermore, the two pistons and cylinders, which are arranged at the opposite ends of the valve, serve as actuators for positively moving the valve by the steam pressure in both directions, and that said actuators oppose each other inasmuch as the operation of each is opposed by the other, and that they are both operated by the steam pressure of the inlet chamber and their movements are retarded by the slow accumulation of steam in either cylinder while the piston therein is moving.

An exhaust pipe $f$ leads from the cylinder $c^5$ to a suitable controlling-device, and an exhaust pipe $f^2$ leads from the extension $d^2$ on the cylinder $c^6$ to said controlling-device, and said controlling-device is constructed and arranged to open one of the exhaust pipes to the atmosphere while the other remains closed, to permit the valve to close, and then to close said exhaust pipe and open the other exhaust pipe to the atmosphere to permit the valve to return to its normal position. Opening the exhaust pipes or passages relieves the pressure and releases the actuators, permitting them to operate and move the valve, one in one direction and the other in the opposite direction.

So far as the employment of the particular form of shut-off valve herein shown is concerned, any suitable form of controlling-device may be employed to effect its operation, so I do not desire to limit my invention to the employment of any particular form of controlling-device for the particular form of shut-off valve herein shown.

The controlling-device herein shown, which may be employed to effect the operation of the shut-off valve, consists essentially of a three-way cock to which the exhaust pipes $f$ and $f^2$ are connected and electrically operated means for controlling the exhaust of the pressure through said pipes.

$f'$ represents the case of the three-way cock and $f^3$ a hollow tapering plug contained in it. The case $f'$ has an inlet-port $f^4$ to which the exhaust-pipe $f$ is connected, and the inlet-port $f^5$ to which an exhaust-pipe $f^2$ is connected and an exhaust-port $f^6$; and the plug $f^3$ has two openings, which, when the plug is in one position registers with one of the inlet ports and with the exhaust-port and when in its other position registers with the other inlet-port and with the exhaust-port. A handle $f^7$ is secured to the plug which serves as a means for turning it.

The electrically operated means for automatically controlling the operation of the shut-off valve consists of a valve $g$, which is contained in a chamber $f^8$ of the case of the three-way cock, and which is movable toward and from a seat formed around the exhaust port $f^6$. The stem $g'$ of the valve $g$ extends through a hole in the case and its end is exposed. A bell-crank lever is pivoted at $g^2$ to the case, one arm as $g^3$ of which is arranged to engage the exposed end of the stem $g'$, and the other arm as $g^4$ of which is connected to the armature $g^5$ of a solenoid $g^6$ or other form of electro-magnet. When the armature is in its attracted position the bell-crank lever is moved to thrust the valve $g$ upon its seat against the steam pressure and to hold it in such position, and when in its retracted position permits said valve $g$ to open. The solenoid $g^6$ is included in an electric-circuit $h$, which is herein represented as a closed circuit, containing a current-generator $h'$, shown as a dynamo, which is arranged to be operated by the engine which is being controlled. The circuit $h$ contains any number of circuit-operating devices $h^2$ of any suitable form which may be operated manually when required to open the circuit. An electro-magnet $h^3$ is also included in the circuit, the armature $h^4$ of which, when in its retracted position, engages a pair of contacts $h^5$ which are arranged in the circuit and when in its attracted position disengages said contacts and thereby open the circuit. The armature is held in its retracted position by a spring $h^6$, which is made strong enough to overcome the attractive influence of the magnet, so that notwithstanding said magnet is energized, its armature will be held retracted. In case the current generated by the dynamo increases sufficiently to overcome the tension of the spring $h^6$ then the armature will be moved by the electro-magnet into its attracted position and the circuit will be opened. Such increase in the strength of the current may be caused by the engine over-speeding or racing. Hence in either case the circuit will be opened and when opened the solenoid $g^6$ will be de-energized and its armature retracted and the valve $g$ permitted to open and thereby open the exhaust port of the three-way cock, to exhaust the pressure from the cylinder $c^5$, and permit the shut-off valve to close. As the supply of steam to the engine is shut off the engine ceases to operate and the dynamo also ceases to operate and no current is generated to charge the circuit $h$. While the parts are in this condition the shut-off valve is reset and to do this the hand-lever $e^6$ is operated to turn the three-way cock a quarter of a revolution, to thereby close the exhaust passage from the cylinder $c^5$ and open the exhaust passage from the cylinder $c^6$, whereupon the pressure from said cylinder $c^6$ is exhausted and the pressure is caused to accumulate in the cylinder $c^5$ and the shut-off valve is opened. As soon as the generator starts it charges the circuit $h$ and the solenoid attracts its armature and the valve $g$ is thrust forward against its seat, closing the exhaust-port of the three-way cock. The hand-lever $f^6$ is then returned to its normal position, closing the passage from the cylinder $c^6$ to the exhaust-port of the three-way cock and opening a passage from the cylinder $c^5$ to said exhaust-port to thereby prepare the controlling-device for another operation. When it is desired to prevent the operation of the shut-off valve, as for instance, if it should become necessary to repair the controlling-device, the steam pressure of the cylinder $c^6$ is entirely withdrawn, so as to enable the piston $c^4$ to move into its cylinder far enough to enable the disk $e'$ to become seated upon the valve-seat $e$. Such seating of the valve entirely closes the passage of the steam to the cylinder $c^6$, so that the valve will remain open.

The controlling-device herein shown for the engine-stop valve may be employed in connection with any other form of shut-off valve than that herein shown, hence I do not desire to limit my invention to its employment in connection with any particular form of shut-off valve.

Having thus described my invention, what I claim as new and desire to secure by Letters Patent is:—

1. In an engine-stop valve, the combination with a valve, of two actuators for respectively moving said valve in opposite directions, both acted upon by the pressure on the inlet side of the valve to thereby balance the valve, means for releasing the pressure on one of said actuators permitting the other actuator to move the valve in one direction, and means for thereafter releasing the pressure of the other actuator permitting the first named actuator to return the valve, substantially as described.

2. In an engine-stop valve, the combination with a valve, of two connected actuators for said valve, one for closing it and the other for opening it, both actuators acted upon by the pressure of the inlet side of the valve to thereby balance the valve, means for releasing the pressure on the opening actuator permitting the closing actuator to operate and close the valve, and also to reset the opening actuator, and means for releasing the pressure on the closing actuator permitting the opening actuator to operate and open the valve and also to reset the closing actuator, substantially as described.

3. In an engine-stop valve, the combination with a balanced valve, balanced actuators for respectively moving said valve in opposite directions, each operated by the steam pressure, and means for separately releasing the pressure on said actuators permitting the unreleased actuator to operate and move the valve, substantially as described.

4. In an engine-stop valve, a balanced valve having a piston at each end moving in a cylinder, means for establishing open communication between the cylinders and the inlet chamber of the valve-case, permitting the pressure on the inlet side of the valve to act upon both pistons, and means for exhausting the pressure of one of the cylinders permitting the piston of the other cylinder to move the valve, substantially as described.

5. In an engine-stop valve, a balanced valve having a piston at each end moving in a cylinder, means for establishing open communication between the cylinders and the inlet chamber of the valve case permitting the pressure on the inlet side of the valve to act upon both pistons, means for exhausting the pressure of one of the cylinders permitting the piston in the other cylinder to move the valve, and means for thereafter exhausting the pressure of the other cylinder permitting the piston in the first named cylinder to return the valve, substantially as described.

6. In an engine-stop valve, a balanced valve, a piston connected to it at each end, a cylinder for each piston, means for establishing open communication between the cylinders and the inlet chamber of the valve-case, permitting the pressure on the inlet side of the valve to act upon both pistons, and means for exhausting the pressure from one of the cylinders permitting the piston in the other cylinder to move the valve and also to reset the piston in the exhausted cylinder, substantially as described.

7. In an engine-stop valve, a balanced valve, a piston connected to it at each end, a cylinder for each piston, means for establishing open communication between the cylinders and the inlet chamber of the valve-case, permitting the pressure on the inlet side of the valve to act upon both pistons, means for exhausting the pressure of one of the cylinders permitting the piston in the other cylinder to move the valve and also to reset the piston in the exhausted cylinder, and means for thereafter exhausting the pressure of the other cylinder, permitting the piston in the first named cylinder to return the valve and also reset the piston in the last named cylinder, substantially as described.

8. In an engine-stop valve, a balanced valve having a piston at each end moving in a cylinder, means for establishing open communication between the cylinders and the inlet chamber of the valve-case, permitting the pressure on the inlet side of the valve to act upon both cylinders, exhaust pipes leading from both cylinders, means for opening one of said exhaust pipes and for retaining the other pipe closed to thereby exhaust the pressure of one of the cylinders permitting the piston in the other cylinder to move the valve, means for closing said exhaust pipe and for opening the other exhaust pipe to enable the pressure to accumulate in the exhausted cylinder and to exhaust the pressure from the other cylinder and permit the piston in the first named cylinder to return the valve, substantially as described.

9. In an engine-stop valve, a balanced valve having a piston at each end moving in a cylinder, means for establishing open communication between the cylinders and the inlet chamber of the valve-case, means for exhausting pressure of first one and then the other cylinder to cause the pistons to move the valve first in one and then in the opposite direction, and a buffer spring arranged to be engaged by one of the pistons when approaching the end of its stroke, substantially as described.

10. In an engine-stop valve, a balanced valve having a piston at each end moving in a cylinder, means for establishing open communication between the cylinders and the inlet chamber of the valve-case, means for exhausting the pressure from first one and then the other cylinder to permit the valve to move first in one and then in the opposite direction, a valve-seat at one end of one of the cylinders adapted to be engaged by said valve, and an adjustable stop for limiting the movement of the valve in a direction toward said valve-seat, which, when in one position, prevents the valve from engaging said seat and when in another position permits the valve to engage the seat, substantially as described.

11. In an engine-stop valve, a valve-case having a partition wall separating the inlet and outlet chambers thereof, formed with two valve-seats in vertical alinement, two cylinders arranged at the opposite ends of said valve-case, also in vertical alinement with each other and with said valve-seats, a double puppet-valve contained in said case adapted to engage said valve-seats, having at each end a piston arranged respectively in said cylinders, means for establishing open communication between said cylinders and the inlet chamber of the valve-case, and means for exhausting first one and then the other cylinder to permit the piston in the other cylinder to move the valve first in one and then in the opposite direction, substantially as described.

12. In an engine-stop valve, a balanced valve having a piston at each end moving in a cylinder, means for establishing open communication between the cylinders and the inlet chamber of the valve-case, whereby the pressure on the inlet side of the valve acts upon both pistons, exhaust pipes leading from each cylinder and means for controlling the passage of steam through said pipes, substantially as described.

13. In an engine-stop valve, the combination with a balanced valve, opening and closing actuators therefor operated by the steam pressure, exhaust passages leading respectively from said actuators, an electrically operated valve to which both of said exhaust passages lead, and a hand operated valve for determining which exhaust passage shall be in open communication with the electrically operated valve, substantially as described.

14. In an engine-stop valve, the combination with a balanced valve, and means for operating it in opposite ways having two exhaust passages by which the pressure may be exhausted to permit the valve to operate, a cock having an exhaust-port and having means for connecting either exhaust passage with said exhaust-port and electrically operated means for opening and closing said exhaust-port, substantially as described.

15. In an engine-stop valve, the combination with a balanced valve, and means for operating it in opposite ways having two exhaust passages by which the pressure may be exhausted to permit the valve to operate, a three-way cock having an exhaust-part and having a plug with openings for connecting either exhaust passage with said exhaust-port, a hand-operated lever for turning said plug, and an electrically operated valve for opening and closing said exhaust-port, substantially as described.

16. In an engine-stop valve, the combination with a balanced valve and means for operating it in opposite ways having two exhaust passages by which the pressure may be exhausted to permit the valve to operate, a cock having an exhaust-port, means for connecting either exhaust-passage with said exhaust-port, a valve for opening and closing said exhaust-port, an electro-magnet, its armature, and means connected with said armature for controlling the operation of said valve, substantially as described.

17. In an engine-stop valve, the combination with a balanced valve and means for operating it in opposite ways having two exhaust passages by which the pressure may be exhausted to permit the valve to operate, a three-way cock having an exhaust-port, a plug having openings for connecting either exhaust passage with said exhaust-port, a hand-lever for turning said plug, a valve for opening and closing said exhaust-port, an electro-magnet, its armature, and means connected with said armature for controlling the operation of said valve, a circuit for said electro-magnet, a current-generator for said circuit which is connected with and operated by the engine which is being controlled, and means for opening said circuit to deënergize said electro-magnet, substantially as described.

18. In an engine-stop valve, the combination of a balanced valve, means for operating it having two exhaust passages by which the pressure may be exhausted to operate the valve in opposite ways, of a valve controlling one of said exhaust passages, an electro-magnet for operating said valve, a normally closed circuit for said electro-magnet, a current-generator for said circuit which is connected with and operated by the engine which is being controlled, means for opening said circuit to deënergize the electro-magnet, and hand-operated means for controlling the other exhaust passage adapted to be operated when the current-generator is at rest and the circuit thereby discharged, substantially as described.

19. In an engine-stop valve, the combination with a valve, an opening actuator and a closing actuator therefor, both operated by the steam pressure, and each adapted to oppose the operation of the other, each actuator having an exhaust passage leading from it by which the pressure may be exhausted to permit the other actuator to operate, electrically-operated means controlling one of said exhaust passages, and hand-operated means controlling the other exhaust passage, substantially as described.

20. In an engine-stop valve, the combination with a valve which is balanced by the steam pressure, and means for operating it when the pressure on one side of it is released, of a valve for opening and closing the exhaust-port, an electro-magnet, its armature, and means connected with said armature for holding said valve closed against the steam pressure while the electro-magnet is energized, a circuit for said electro-magnet, a current-generator for said circuit connected with and operated by the engine which is being controlled, and means for opening said circuit to deënergize said electro-magnet, substantially as described.

In testimony whereof, I have signed my name to this specification, in the presence of two subscribing witnesses.

JAMES L. KIMBALL.

Witnesses:
B. J. NOYES,
H. B. DAVIS.